United States Patent Office 2,990,376
Patented June 27, 1961

2,990,376
CROSS-LINKING AGENT AND METHOD FOR MAKING SAME
Wilbur L. Bressler and Calvin F. Ward, Lake Jackson, Tex., assignors to The Dow Chemical Company, Midland, Mich., a corporation of Delaware
No Drawing. Filed Jan. 29, 1959, Ser. No. 789,784
8 Claims. (Cl. 252—182)

This invention relates to a cross-linking agent for making rigid polyether type polyurethane cellular plastic materials.

Various cross-linking agents can be employed to cross-link polyurethane resins in rigid polyether type polyurethane cellular plastic material production. However, these cross-linking agents do not produce cellular plastic materials which have excellent dimensional stability. By "excellent dimensional stability," and the expression will be used hereinafter thus, is meant that the cellular plastic materials will not distort more than ±10 volume percent, upon being subjected to the usual heat and/or moisture resistance tests. When a cellular plastic material lacking dimensional stability shrinks, its density increases and it pulls away from its enclosing surfaces. The shape of articles made from the cellular plastic material will also be objectionably altered.

Two cross-linking agents which are known in rigid cellular plastic material production are 1,2,3-tris(2-hydroxypropyl) glycerol [Equation 1], and octakis(2-hydroxypropyl) sucrose [Equation 2].

(1) Glycerol+3 propylene oxide→1,2,3-tris(2-hydroxypropyl)glycerol
(2) Sucrose+8 propylene oxide→octakis(2-hydroxypropyl)sucrose Hereinafter, 1,2,3-tris(2-hydroxypropyl)glycerol will be abbreviated to "THPG" and octakis(2-hydroxypropyl) sucrose will be abbreviated to "OHPS."

The expression "rigid foam" will hereinafter be used to mean a rigid polyether type polyurethane cellular plastic material.

When THPG is used as a cross-linking agent for rigid foams, the rigid foams exhibit a lack of dimensional stability. For example, if rigid foam is prepared using THPG as the cross-linking agent and trichlorofluoromethane as the blowing agent, the rigid foam will swell greater than 10 volume percent, upon being subjected to heat and/or moisture. If, in the above rigid foam preparation, water is used as the blowing agent, the rigid foam will shrink greater than 10 volume percent, upon being subjected to heat and/or moisture.

When OHPS is used as a cross-linking agent for rigid foams, foam preparation becomes very difficult and the rigid foam produced is lumpy, of greatly varying cell size, and lacking in dimensional stability. These foam faults can be attributed in general to the viscosity of the OHPS since at room temperature, OHPS is, for all practical purposes, a solid.

It is an object of the present invention to provide a cross-linking agent which can be used to prepare rigid polyether type polyurethane cellular plastic materials having excellent dimensional stability as characterized by their unusual resistance to distortion upon heating and/or wetting. Another object is to provide a process for making a cross-linking agent which can be used to prepare rigid foams having excellent dimensional stability. And still another object is to provide a continuous process for making a cross-linking agent which can be used to prepare rigid foams having excellent dimensional stability. Further objects will appear from the detailed description of the invention which follows.

It has been discovered that a mixture of THPG and OHPS is unusually good as a cross-linking agent for preparing rigid foams having excellent dimensional stability.

While there is some advantage in mixing THPG and OHPS in any ratio, the preferred ratio is about 2 to 3 moles of the former per mole of the latter, this being the range in which (1) the rigid foam produced therefrom has maximum dimensional stability and (2) the cross-linking agent is easily made and is sufficiently liquid to be easily handled and mixed with the resin to be cross-linked.

The cross-linking agent may be prepared by simply mixing the two components in the desired proportions. Since OHPS is so viscous as to be practically solid at ordinary temperatures and also is sensitive to deterioration by elevated temperatures, considerable care and time are required for the mixing operation if complete blending without damage is to be achieved. The two components may be stirred together, preferably with warming to about 50–100° C., until the mixture is homogeneous. Alternatively, the two may be separately warmed and one added to the other gradually, with effective agitation.

A preferred process for making the cross-linking agent and one that largely obviates the difficulties inherent in making the two components separately and then mixing them, comprises dissolving sucrose in glycerol in the desired proportions and condensing the stoichiometric amount of propylene oxide with the resulting mixture; that is, one mole of oxide for each hydroxyl equivalent in the mixture. For this condensation a catalyst is necessary. While any tertiary amine free of labile hydrogens may be used, the preferred catalyst is triethylamine or tripropylamine. It is known that these particular amines have the peculiar property of catalyzing the condensation of one, and only one, mole of propylene oxide with each hydroxyl group of sucrose and glycerol. Thus, when these catalysts are used in the present invention, a stoichiometric excess of propylene oxide can be used, yet an extremely uniform product is obtained wherein substantially every hydroxyl group on the glycol and sucrose is replaced with a 2-hydroxypropyl group; hence, the product is free of polyoxypropylene derivatives. The use of these catalysts for this type of reaction is more fully disclosed and claimed in the copending applications of Arthur W. Anderson, Serial No. 630,067, filed December 24, 1956, and Serial No. 658,020, filed May 9, 1957, now issued as U.S. Patent Nos. 2,927,918, and 2,902,478 respectively. These copending applications also describe a preferred method for making OHPS and THPG. By the term "labile hydrogen" we mean hydrogen sufficiently active to react with propylene oxide under the reaction conditions used in the process of the invention. This safe, easily controlled reaction, which is readily adaptable to continuous operation, produces an uncolored cross-linking agent which has a viscosity of approximately 180 stokes at 210° F. The cross-link agent produced by this homogeneous reaction will hereinafter be called "polyol" and the foams having excellent dimensional stability produced therewith are fully described and claimed in the copending application by W. L. Bressler and B. D. Davis, filed January 29, 1959; Serial Number 789,783.

According to the preferred homogeneous reaction method for preparing the polyol, a solution is prepared by dissolving 1 mole of sucrose in from 2 moles to 3 moles of glycerol with the preferred amount of glycerol being in the range of from 2.5 moles to 2.8 moles. When less than 2 moles of glycerol is used per 1 mole of sucrose, the sucrose does not completely dissolve and upon cooling the finished polyol, this sucrose which was not originally dissolved precipitates and causes the finished polyol to be cloudy. When the amount of glycerol is increased beyond 3 moles to 1 mole of sucrose, there is not enough sucrose present in the finished polyol to produce rigid foams having excellent dimensional stability. To this sucrose solution, from 0.5 percent to 2 percent, based on the total weight of sucrose and glycerol, tertiary amine, preferably triethylamine or tripropylamine, is added as a reaction catalyst and, optionally but preferably, from 0.5 to about 2 percent water also based on the total weight of sucrose and glycerol. The preferred amount of tertiary amine is from 0.8 to 1 percent. When less than 0.5 percent is used, the reaction proceeds very slowly, and when more than 2 percent is used, the reaction is so rapid that temperature control is difficult and the resulting product is usually dark colored. The tertiary amine can be selected from those aliphatic, heterocyclic, or aryl amines, or combinations thereof, which are soluble in the reaction media and which have no other functional groups containing labile hydrogen. Representative compounds include triethylamine, N-methylmorpholine, dimethylaniline, methyldiethylamine, and dimethylethylamine. It has been found desirable, though not essential, that the sucrose-glycerol mixture contain a small proportion of water. It has been found that when the reaction is run without water, the reactants must be heated to about 120° C. to start the reaction. Once the reaction has begun, the temperature rises rapidly and the polyol may develop a dark color. When water is present in the reaction mixture, the reaction will proceed with excellent results at a temperature of about 100° C. and the resulting polyol is not colored. A suitable amount is about 0.5-2 percent by weight (about 5 to 20 mole percent).

To this sucrose solution containing catalyst and water, a stoichiometric amount of propylene oxide is added over a period of from 2 to 40 hours while the reaction mass is maintained at a temperature from about 90° to about 120°, and preferably at a temperature of about 100° C. while under a pressure at least equal to autogenous pressure. The finished polyol usually has a viscosity of about 160 to 200 stokes at 210° F.

A preferred method of preparing the polyol continuously uses a one-pass coil reactor jacketed for steam and water, a pump for supplying propylene oxide to the reactor, and a pump for supplying the glycerol-sucrose mixture to the reactor. The reactor is maintained at a temperature of from 90° to 110° C. and a pressure of at least 100 p.s.i.g. The desired feed rate is such that the retention time in the reactor is at least about 2 hours.

The following specific examples will better illustrate the practice of the present invention; however, the invention is not intended to be limited to these examples.

EXAMPLE 1.—POLYOL PREPARATION

Into a reaction vessel equipped with a means for stirring, temperature control, and maintaining a methane atmosphere were placed 17.1 pounds of refined beet sugar, 11.5 pounds of glycerol and 105 grams of triethylamine catalyst. The mixture was preheated to 130° C. after which 45 pounds of propylene oxide was added over a 12-hour period. During this period, the pressure maintained by the propylene oxide was from about 30 to about 40 p.s.i.g. and the temperature was maintained at about 125° to 135° C. Upon completion of the propylene oxide addition, the reaction mixture was digested for 2 hours at approximately 130° C. At the end of the 2-hour digestion period, the pressure in the vessel was reduced to 5 mm. absolute, and maintained thereat for 15 minutes while maintaining the temperature at about 130° C. The product had the following properties:

Viscosity=182 stokes at 210° F.
APHA color=>250

EXAMPLE 2.—POLYOL PREPARATION

The polyol was prepared as in Example 1 with the exception that refined cane sugar was used instead of beet sugar.

Viscosity=181 stokes at 210° F.
APHA color=>250

EXAMPLE 3.—POLYOL PREPARATION

Into a reaction vessel equipped with a means for stirring, temperature control, and maintaining a methane atmosphere were placed 17.1 pounds of beet sugar, 11.5 pounds of glycerine, and 105 grams of triethylamine catalyst. The mixture was preheated to 90° C., after which 45 pounds of propylene oxide was added over a 6-hour period. During this period, the pressure was maintained by the propylene oxide at about 40 to 50 p.s.i.g. and the temperature was maintained at about 90° C. Upon completion of the propylene oxide addition, the reaction mixture was digested for 2 hours at approximately 100° C. At the end of the 2-hour digestion period, the pressure in the vessel was reduced to 5 mm., absolute, and maintained thereat for 15 minutes while maintaining the temperature at about 100° C. The product had the following properties:

Viscosity=185 stokes at 210° F.
APHA color=>200

EXAMPLE 4.—POLYOL PREPARATION

Into a reaction vessel equipped with a means for stirring, temperature control, and maintaining a methane atmosphere were placed 17.1 pounds of beet sugar, 11.5 pounds of glycerol, 210 grams of triethylamine catalyst, and 210 grams of water. The mixture was preheated to 100° C., after which 45 pounds of propylene oxide was added over a 12-hour time period. During this period, the pressure was maintained by the propylene oxide at from about 40 to about 50 p.s.i.g. and the temperature was maintained at about 100° C. Upon completion of the propylene oxide addition, the reaction mixture was digested for 2 hours at approximately 100° C. At the end of the digestion period, the pressure in the vessel was reduced to 5 mm., absolute, and maintained thereat for 15 minutes while maintaining the temperature at about 100° C. The product had the following properties:

Viscosity=179.5 stokes at 210° F.
APHA color=90

EXAMPLE 5.—POLYOL PREPARATION

The polyol was prepared as in Example 4 with the exception that 105 grams of triethylamine catalyst was used instead of 210 grams.

Viscosity=180
APHA color=70

EXAMPLE 6.—CONTINUOUS PREPARATION OF POLYOL

A feed solution was prepared by placing into a reaction vessel, equipped with a means for stirring and temperature control, 42.75 pounds of beet sugar, 28.75 pounds of glycerol, and 2100 ml. of water. The mixture was digested for 2 hours at approximately 100° C. At the end of this digestion period, 525 grams of triethylamine catalyst was thoroughly stirred into the mixture.

The feed solution was pumped by a micro metering pump at the rate of 310 ml. per hour into a 1-inch stainless steel coil reactor which had a total length of 18 feet and which was equipped with a means for maintaining the temperature at about 100° C. and a means for constant pressure take-off, the pressure being held at about 100 p.s.i.g. At the same time, a second micro metering pump pumped propylene oxide at the rate of 590 ml. per hour to the reactor. These two feed rates were such that the retention time of the reactants in the reactor was about 4 hours. After being devolatilized, the finished polyol had the following properties:

APH color=90

EXAMPLE 7.—POLYOL PREPARATION

Into a reaction vessel equipped with a means for stirring, temperature control, and maintaining a methane atmosphere were placed 17.1 pounds of refined cane sugar, 11.5 pounds of glycerol, 105 grams of triethylamine catalyst, and 208 grams of water. The mixture was preheated to 100° C., after which 34 pounds of ethylene oxide was added over a 4-hour period. During this period, the pressure was maintained by the ethylene oxide at about 40 to about 50 p.s.i.g. and the temperature was maintained at about 100 to 110° C. Upon completion of the ethylene oxide addition, the reaction mixture was digested for 2 hours at approximately 110° C. At the end of the digestion period, the pressure in the vessel was reduced to 5 mm., absolute, and maintained thereat for 15 minutes while maintaining the temperature at about 120° C. The product had the following properties:

Viscosity=53 centistokes 210° F.
APHA color=100

EXAMPLE 8.—POLYOL PREPARATION

Into a reaction vessel equipped with a means for stirring, temperature control, and maintaining a methane atmosphere were placed 17.1 pounds of refined cane sugar, 11.5 pounds of glycerol, 105 grams of triethylamine catalyst, and 208 grams of water. The mixture was preheated to 110° C., after which 55.8 pounds of butylene oxide was added over a 4-hour period. During this period, the pressure was maintained by the butylene oxide at about 20 to 30 p.s.i.g. and the temperature was maintained at about 100 to 110° C. Upon completion of the butylene oxide addition, the reaction mixture was digested for 2 hours at approximately 110° C. At the end of the digestion period, the pressure in the vessel was reduced to 5 mm., absolute, and maintained thereat for 15 minutes while maintaining the temperature at about 120° C. The product had the following properties:

Viscosity=53 centistokes at 210° F.
APHA color=80

EXAMPLE 9.—FOAM PREPARATION USING THPG AS THE CROSS-LINKING AGENT

Component A

Component A consisted of 165 grams of THPG semi-prepolymer and 32.5 grams of trichlorofluoromethane. The THPG semiprepolymer was prepared in the following manner:

Into a reaction vessel equipped with a means for heating, temperature control, and maintaining a nitrogen atmosphere were placed 9750 grams of toluene diisocyanate. The toluene diisocyanate was then preheated to 60° C., after which 2,430 grams of 1,2,3-tris(hydroxypropyl) glycerol were added over a 45-minute period. During this period, the temperature of the reaction vessel was maintained between 55 and 60° C. The THPG semi-prepolymer thus produced had a viscosity at 24° C. of 42 stokes and an NCO content of 27.5 percent.

Component B

Component B consisted of 84.6 grams of THPG, 0.6 gram of triethylenediamine, and 0.3 gram of Silicone XL–520 (Organosilicone polymer made by Union Carbide).

The components, A and B, were thoroughly mixed for 20 seconds and immediately poured into a rectangular mold. The mass expanded and had the following properties:

84 percent closed cells
Density=2.2

The foam swelled 11 percent while being subjected to 16 hours in the humidity-ageing chamber. This chamber maintains a humidity of 98 percent at a temperature of 158° F.±2°.

EXAMPLE 10.—FOAM PREPARATION USING PROPYLENE OXIDE POLYOL AS THE CROSS-LINKING AGENT

Component A

Component A consisted of 160 grams of THPG semi-prepolymer, prepared as in Example 9 and 21.5 grams of trichlorofluoromethane.

Component B

Component B consisted of 78.4 grams of the polyol as produced in Example 4, 1.8 grams of water, 0.9 gram of triethylenediamine, and 0.6 gram of Silicone XL–520.

The components, A and B, were thoroughly mixed for 20 seconds and immediately poured into a rectangular mold. The mass expanded and had the following properties:

80 percent closed cells
Density=2.1

The foam swelled 3 percent while being subjected to 192 hours in the humidity-ageing chamber.

EXAMPLE 11.—FOAM PREPARATION USING OHPS AS THE CROSS-LINKING AGENT

An attempt at foam preparation as in Example 10 was made by preparing a component A consisting of blowing agent and the THPG semiprepolymer. The quantity of OHPS required for component B was heated to about 67° C. in order to get it from a solid state to a heavy, viscous state. At this temperature, the tertiary amine and Silicone XL–520 were stirred in. When hot component B was added to cold component A, the reaction was so rapid that stirring could not be accomplished and further, a major portion of the blowing agent vaporized and was lost. The product was a somewhat foamed lumpy mass and no attempt at property evaluation was made.

The polyol products of the invention are especially useful for cross-linking foamed urethane resins as hereinbefore set forth. Also, they are useful as softeners and plasticizers for paper, cellophane and other cellulosic materials and as intermediates in the production of alkyd resins, surfactants, drying oil esters and the like.

We claim:

1. A composition comprising the polyol product formed by the reaction of (1) a mixture of one mole of sucrose, about 2–3 moles of glycerol and about 0–1 mole of water with (2) one mole of propylene oxide per hydroxyl equivalent in said sucrose, glycerol and water, said reaction being conducted in the presence of a catalytic amount of a tertiary amine free of labile hydrogen, at a temperature of about 80 to 140° C. and under a pressure at least equal to the autogenous pressure.

2. A composition as defined in claim 1, the amine used as a catalyst in its production being a trialkylamine.

3. A composition as defined in claim 1, the amine used as a catalyst in its production being triethylamine.

4. A composition as defined in claim 1, the mixture of sucrose and glycerol used in its production containing about 0.2 to 0.4 mole of water.

5. A process comprising reacting by contacting in a liquid phase at a temperature of about 80–140° C. and in the presence of a catalytic amount of a tertiary amine free of labile hydrogen (1) a mixture of one mole of sucrose, about 2 to 3 moles of glycerol and 0 to about 0.4 mole of water and (2) at least about one mole of propylene oxide per hydroxyl equivalent in said sucrose, glycerol and water.

6. A process as defined in claim 5 wherein the amine is a trialkylamine.

7. A process as defined in claim 5 wherein the amine is triethylamine.

8. A process as defined in claim 5 wherein the amount of water is about 0.2 to 0.4 mole.

References Cited in the file of this patent

UNITED STATES PATENTS

| | | |
|---|---|---|
| 2,849,474 | Bloch et al. | Aug. 26, 1958 |
| 2,866,774 | Price | Dec. 30, 1958 |
| 2,902,478 | Anderson | Sept. 1, 1959 |

FOREIGN PATENTS

| | | |
|---|---|---|
| 769,091 | Great Britain | Feb. 27, 1957 |